(No Model.)

B. BLOOD.
Swathing Reaper.

No. 234,651.  Patented Nov. 23, 1880.

Witnesses:
H. A. Blood
S. E. McLaughlin

Inventor:
Benj. Blood

UNITED STATES PATENT OFFICE.

BENJAMIN BLOOD, OF AMSTERDAM, NEW YORK.

SWATHING-REAPER.

SPECIFICATION forming part of Letters Patent No. 234,651, dated November 23, 1880.

Application filed August 7, 1880. (No model.)

*To all whom it may concern:*

Be it known that I, BENJAMIN BLOOD, of Amsterdam, New York, have invented a new and useful Improvement in Swathing-Reapers, of which the following is a specification.

My invention is a swathing attachment to the ordinary mowing or reaping machine, taking power from such machine.

It consists, in general terms, of a vibrating apron worked back and forth on the platform of the machine by a barbed pitman and wheel, which throw the butts of the grain inward on the stubble of the preceding swath, while the heads rest, turn, and are carried forward to the desired position by an adjustable extension of the platform at its rear and near corner, leaving the swath in the reverse of the ordinary position.

Figure 1:
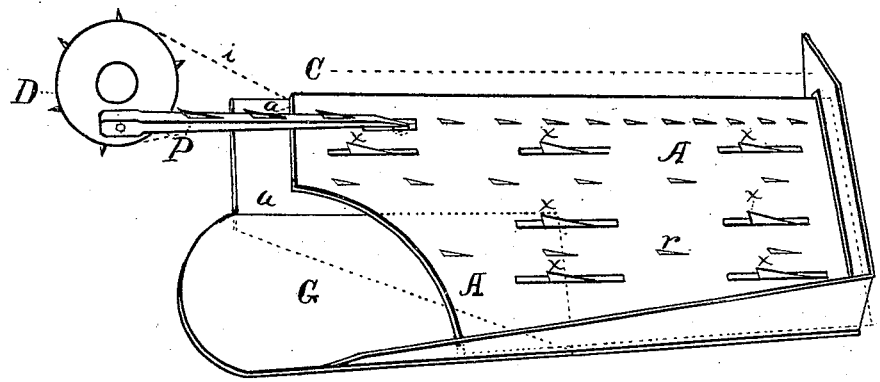
Figure 2:
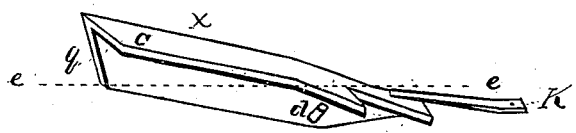

The drawings herewith as part hereof show, in Figure 1, a rear view of my device in perspective and plan, and in Fig. 2 a peculiar dog which protrudes through the apron to hold the grain forward when the apron glides backward.

In Fig. 1 the dotted line C marks the position and relative extent of the cutting apparatus.

The fixed platform *a a* is attached to the finger-bar and sustained by the dividing-shoe in the usual manner. The adjustable extension G is fitted into this platform at its near end in the rear corner, and arranged to protrude inward more or less, as the length of the grain may require. The apron A, made of sheet metal stiffened or of thin hard wood, lies upon the platform and the extension, and in proper grooves or guides glides in and out directly in rear of the cutters, armed with small barbs *r* and pierced with slots for the admission of the dogs *x*, which protrude through it from the platform beneath. The weight of the apron on its bearings may be easily lightened by elastic suspenders on the outer end. The barbed pitman P, which connects with the barbed wheel D, should clutch the apron eight or ten inches from its forward edge that the barbs may get a thorough hold of the butts of the grain. A small belt (indicated by dots) may run from the wheel D to the corner of the platform to render the delivery more uniform. The pitman and balance-wheel of the sickle, which are in line with the butts of grain as they are cut, must be guarded with sheet metal, as the mat of the swath often passes directly over them when cutting on descending ground. The dogs *x*, which are pivoted on the platform *a a*, protrude above the apron that portion of each which in Fig. 2 shows above the dotted line *e e*. A small knob or pin in each slot, traversing the line *e e* as the apron moves inward, glides over the top of the dog and bears it down and holds it down until its point is passed, when the dog immediately sits up again, acted on by the spring K, and the pin or knob passes back under the flange *c*, lifts the rear of the dog the space of the slot at its pivot *d*, escapes in the rear, and is ready to again glide over the top. Thus the dog is always down while the apron is going inward, and up all the time in which the apron is retiring for fresh grain.

The saving of motion in erecting the dogs in this manner over any method wherein the dogs are erected by the recoil of the grain itself is obvious.

The flange *c* may be a spring at its rear end and obviate the slot at the pivot *d*.

The device works most easily while the outer end is slightly higher and the rear of the whole platform lower than the front, especially at the near corner, for it is to be observed that this machine passes along under the swath, and no part thereof is at any time over it.

The operation to be directly inferred from the foregoing description is as follows: The grain when cut, having been driven well back on the apron by a strong reel, is urged by the barbs *r* toward the delivery, the dogs *x* holding it forward while the apron retires. Arrived on the smooth table G, the heads are free from the direct action of the carrying device A and pause in their lateral motion, and assume a pivotal motion as the butts still come inward, urged by the barbed pitman P upon the barbed wheel D, which throws them on the stubble of the previous swath. As the reaper advances the stubble pushes the butts diagonally, the heads ride forward, and if the extension G is adjusted to the length of the stalks the latter will quit the platform when they have reached a line perpendicular to the path of the machine in a perfect swath, although delivered in the reverse of the ordinary position, the heads lying toward the standing grain.

What I claim as my invention, and desire to secure by Letters Patent, is—

1. In a rearward-sloping platform, the adjustable table G and carrying device A, cut away so as to leave the inner rear corner of said table clear to receive the heads of the grain and to protect them from the direct action of the carrying device and from the stubble below, in combination with the barbed pitman P and the barbed wheel D.

2. The dog $x$, when so combined with the carrying device A and platform $a$ that it takes its erection and depression from them instead of from the action of the grain.

BENJ. BLOOD.

Witnesses:
  H. A. BLOOD,
  JOHN P. BLOOD.